(12) United States Patent
Nguyen et al.

(10) Patent No.: US 9,100,723 B2
(45) Date of Patent: Aug. 4, 2015

(54) METHOD AND SYSTEM FOR MANAGING INFORMATION ON A VIDEO RECORDING

(75) Inventors: Phuong Nguyen, San Jose, CA (US); Alan Messer, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1632 days.

(21) Appl. No.: 11/713,370

(22) Filed: Mar. 1, 2007

(65) Prior Publication Data
US 2007/0214488 A1   Sep. 13, 2007

Related U.S. Application Data

(60) Provisional application No. 60/780,400, filed on Mar. 7, 2006.

(51) Int. Cl.
*H04N 5/445*  (2011.01)
*G06F 17/30*  (2006.01)
(Continued)

(52) U.S. Cl.
CPC ...... *H04N 21/8405* (2013.01); *G06F 17/30796* (2013.01); *G06F 17/30817* (2013.01); *G11B 27/28* (2013.01); *H04N 9/8042* (2013.01); *H04N 21/4147* (2013.01); *H04N 21/44008* (2013.01); *H04N 21/44222* (2013.01); *H04N 21/4668* (2013.01); *H04N 21/4826* (2013.01); *H04N 21/4828* (2013.01); *H04N 21/84* (2013.01);
(Continued)

(58) Field of Classification Search
CPC ............... H04N 21/44008; H04N 21/4668; H04N 21/8405

USPC .................................................... 725/46, 53
See application file for complete search history.

(56) References Cited

U.S. PATENT DOCUMENTS 5,835,667 A * 11/1998 Wactlar et al. ................. 386/96
6,334,127 B1   12/2001 Bieganski et al.
(Continued)

FOREIGN PATENT DOCUMENTS

KR   10-2002-0005147 A   1/2002
KR   10-2002-0006810 A   1/2002
(Continued)

OTHER PUBLICATIONS

Apple Inc., Apple iTunes, http://www.apple.com/itunes/, Apr. 28, 2003.
(Continued)

*Primary Examiner* — Benjamin R Bruckart
*Assistant Examiner* — Carmine Malangone
(74) *Attorney, Agent, or Firm* — Sherman IP LLP; Kenneth L. Sherman; Hemavathy Perumal

(57) ABSTRACT

A method and system that implement a process for managing video information on a video recording device. The management process involves receiving a video input signal including a video stream, obtaining content information corresponding to the video stream, associating the content information with the video stream, and storing the video stream and associated content information in a database as a searchable index for the video stream. The searchable index includes location of the stored video stream and identifies the associated content information. Then, content information from an input signal corresponding to a video stream is captured for analysis and searching the index to identify stored video streams related to the video program for suggestion to the user.

48 Claims, 5 Drawing Sheets

(51) Int. Cl.
*H04N 21/8405* (2011.01)
*H04N 21/44* (2011.01)
*H04N 21/466* (2011.01)
*G11B 27/28* (2006.01)
*H04N 9/804* (2006.01)
*H04N 21/4147* (2011.01)
*H04N 21/442* (2011.01)
*H04N 21/482* (2011.01)
*H04N 21/84* (2011.01)
*H04N 5/765* (2006.01)
*H04N 9/82* (2006.01)

(52) U.S. Cl.
CPC .............. *H04N 5/765* (2013.01); *H04N 9/8205* (2013.01); *H04N 9/8233* (2013.01)

(56) References Cited

U.S. PATENT DOCUMENTS

| | | | |
|---|---|---|---|
| 6,415,099 B1 * | 7/2002 | Berger | 386/291 |
| 6,438,579 B1 | 8/2002 | Hosken | |
| 6,463,433 B1 * | 10/2002 | Baclawski | 1/1 |
| 7,162,473 B2 | 1/2007 | Dumais et al. | |
| 7,228,556 B2 * | 6/2007 | Beach et al. | 725/53 |
| 2002/0104088 A1 | 8/2002 | McGee et al. | 725/51 |
| 2003/0164844 A1 * | 9/2003 | Kravitz et al. | 345/700 |
| 2004/0025180 A1 * | 2/2004 | Begeja et al. | 725/46 |
| 2004/0117831 A1 | 6/2004 | Ellis et al. | |
| 2004/0133927 A1 * | 7/2004 | Sternberg et al. | 725/136 |
| 2005/0086219 A1 * | 4/2005 | Martin | 707/3 |
| 2005/0120391 A1 * | 6/2005 | Haynie et al. | 725/135 |
| 2005/0172318 A1 * | 8/2005 | Dudkiewicz et al. | 725/46 |
| 2006/0056800 A1 * | 3/2006 | Shimagami et al. | 386/52 |
| 2007/0027844 A1 * | 2/2007 | Toub et al. | 707/3 |
| 2007/0154163 A1 * | 7/2007 | Cordray | 386/52 |
| 2009/0077195 A1 | 3/2009 | Gibbs et al. | |
| 2010/0005084 A1 | 1/2010 | Nguyen et al. | |
| 2012/0030713 A1 * | 2/2012 | Begeja et al. | 725/53 |

FOREIGN PATENT DOCUMENTS

| | | |
|---|---|---|
| KR | 10-2004-0052339 A | 6/2004 |
| KR | 10-2006-0027226 A | 3/2006 |
| WO | WO 01/37465 A2 | 5/2001 |
| WO | WO 02/43310 A2 | 5/2002 |
| WO | WO 2005/055196 A2 | 6/2005 |
| WO | WO 2007/004110 A2 | 1/2007 |

OTHER PUBLICATIONS

Babaguchi, N. et al., "Intermodal collaboration: A strategy for semantic content analysis for broadcasted sports video," Sep. 2003, pp. 13-16.
Brill, E., "A simple rule-based part of speech tagger," Mar. 1992, Proceedings of the Third Conference on Applied Natural Language Processing, Trento, Italy.
Google Inc., Google Search Engine, http://www.google.com, Aug. 1998.
Google Inc., Google Desktop Search, http://desktop.google.com, Oct. 15, 2004.
Henzinger, M. et al, "Query-free news search," May 2003, Proceedings on the 12th International Conference on World Wide Web, Budapest, Hungary.
Livingston, K. et al., "Beyond broadcast: a demo," Jan. 2003, In Proceedings of the 8th international Conference on intelligent User interfaces, ACM Press, New York, NY, 325-325.
Microsoft Corporation, Microsoft Windows Media Player, http://www.microsoft.com/windows/windowsmedia/, Feb. 1999.
Microsoft Corporation, MSN TV, http://www.webtv.com/pc, Feb. 2006.
Opera Software ASA, Opera Browser for Devices, http://www.opera.com/products/devices/, Mar. 2006.
Rau Lisa, F. et al., "Domain-independent summarization of news," Jun. 1994, In Summarizing Text for Intelligent Communication, pp. 71-75, Dagstuhl, Germany.
Spalti, M., "Finding and Managing Web Content with Copernic 2000," Sep. 2000, Library Computing, Westport, pp. 217-221, vol. 18, No. 3.
Tjondronegoro, D. et al., "Extensible detection and indexing of highlight events in broadcasted sports video," Jan. 2006, Proceedings of the 29th Australasian Computer Science Conference, Hobart, Australia.
Wachman, J. et al., "Tools for Browsing a TV Situation Comedy Based on Content Specific Attributes," Mar. 2001, Multimedia Tools and Applications, v.13 n. 3, p. 255-284.
Yahoo Search Engine, http://search.yahoo.com, Dec. 1998.
Zhuang, Y. et al, "Applying semantic association to support content-based video retrieval," Oct. 1998, International workshop on Very Low Bitrate Video Coding (VLBV'98).
Notification of Transmittal of the International Search Report and the Written Opinion of the International Search Authority Application No. PCT/KR2008/000537 dated May 15, 2008, 16 pages.
Notification of Transmittal of the International Search Report and the Written Opinion of the International Searching Authority for International Application No. PCT/KR2008/001558, dated Jun. 26, 2008, 10 pages.
Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.
Livingston, K. et al., "Beyond Broadcast," 8th International Conference on Intelligent User Interfaces, Jan. 2003, pp. 260-262, Association for Computing Machinery, New York, NY.
Sen, S. et al., "Proxy Prefix Caching for Multimedia Streams," IEEE Proceedings INFOCOM 1999 18th Annual Joint Conference of the IEEE Computer and Communications Societies, Mar. 1999, pp. 1310-1319, vol. 3, IEEE Computer and Communications Societies Press, New York, NY, United States.
El-Saddik, A. et al., "Exploiting User Behaviour in Prefetching WWW Documents," Proceedings of 5th International Workshop on Interactive Distributed Multimedia Systems and Telecommunication Service, 1998, pp. 302-311, vol. 1483 of Lecture Notes in Computer Science, Springer-Verlag, Berlin, Germany.
U.S. Non-final Office Action for U.S. Appl. No. 12/166,265 mailed Oct. 4, 2010.

* cited by examiner

METHOD AND SYSTEM FOR MANAGING INFORMATION ON A VIDEO RECORDING

RELATED APPLICATION

This application claims priority from U.S. Provisional Patent Application Ser. No. 60/780,400 filed on Mar. 7, 2006, incorporated herein by reference.

FIELD OF THE INVENTION

The present invention relates to video recording and playback and in particular, to video recording with related video suggestion lists on Personal Video Recorder (PVR) devices.

BACKGROUND OF THE INVENTION

Video recording and playback devices have been developed on many PVR set top boxes. However, such PVRs do not implement user friendly video recording and search functions. This lack of user friendly functionality becomes further pronounced when a user interface device, such as remote control is utilized, which is typically without a keyboard for alphabet key inputs. Further, such PVRs cannot automatically search for any video streams in a database (e.g., local content, databases on the Internet, etc.) that are related to a currently watched program.

Another shortcoming of such PVRs is that they can only record video streams, without the ability to record related information. Nor can such PVRs suggest any pre-recorded video stream that is related to a currently viewed video stream. There is, therefore, a need for a method and system that allows recording and analysis of content related information to enable suggesting a pre-recorded video stream related to a currently viewed video stream.

BRIEF SUMMARY OF THE INVENTION

The present invention provides a method and system that implement a process for managing video information on a video recording device. In one embodiment, the process involves receiving a video input signal including a video stream, obtaining content information corresponding to the video stream, associating the content information with the video stream, and storing the video stream and associated content information in a database as a searchable index for the video stream. The index includes the location of the stored video stream and identifies the associated content information. The input signal further includes content information corresponding to the video stream which is captured for analysis and searching the index to identify stored video streams related to the video program for suggestion to the user.

In another embodiment of the present invention, the management process includes a recording phase and a viewing phase. The recording phase includes receiving a video input signal including a video stream, obtaining content information corresponding to the video stream, associating the content information with the video stream, storing the video stream and associated content information in a database, and generating an index that provides the location of the stored video stream in the database, and identifies the associated content information. The viewing phase includes receiving a video input signal including a video stream comprising a video program currently being watched by a user, upon user request, using the content information to extract keywords related to the video program, wherein the content information includes closed-caption and/or subtitle information for the video program, and using the keywords, searching the index and identify stored video streams related to the video program.

These and other features, aspects and advantages of the present invention will become understood with reference to the following description, appended claims and accompanying figures.

DETAILED DESCRIPTION OF THE INVENTION

The present invention provides a method and system for managing video recordings on video recording devices, and providing user friendly searching functionality. Examples of such video recording devices include PVRs, Digital Video Recorders (DVRs), etc.

In the following description, an example implementation in a PVR that receives a video stream is described. Available information related to the video stream is used to simplify video recording and searching, especially when using a control interface without a full keyboard for video recording and searching. In one implementation, the management system allows a user to view/record the incoming video stream, and further records related information for the video stream. The management system also suggests viewing pre-recorded videos related to the incoming video stream. A suggestion list of pre-recorded videos is provided which can be based on locally available information (e.g., in a local/home network) and/or external sources (e.g., the Internet).

In one example, a user is currently watching/viewing a video stream comprising a TV program on a selected channel, and wishes to record that program. In the description herein, a program being viewed includes a video stream on a TV channel being viewed (e.g., a cable signal, satellite signal, etc.), a video stream from another source including locally available video streams (e.g., from a DVD player, the PVR itself, etc.), a pre-recorded video stream (e.g., from a disk drive), a video stream, etc.

When the user presses a designated Record button on a control interface (e.g., TV remote control, GUI, etc.) to record a program the user is viewing, the management system begins recording the current program and corresponding content information (i.e., closed-captions, other related information about the current program including metadata, etc.). The management system also presents to the user a suggestion listing of pre-recorded video streams that are related to the current program. In one example, the management system presents to the user a suggestion listing of pre-recorded video streams with keywords in their closed-captions or other related information, that are related to (e.g., match) that of the current program being viewed and recorded.

Figure 1:
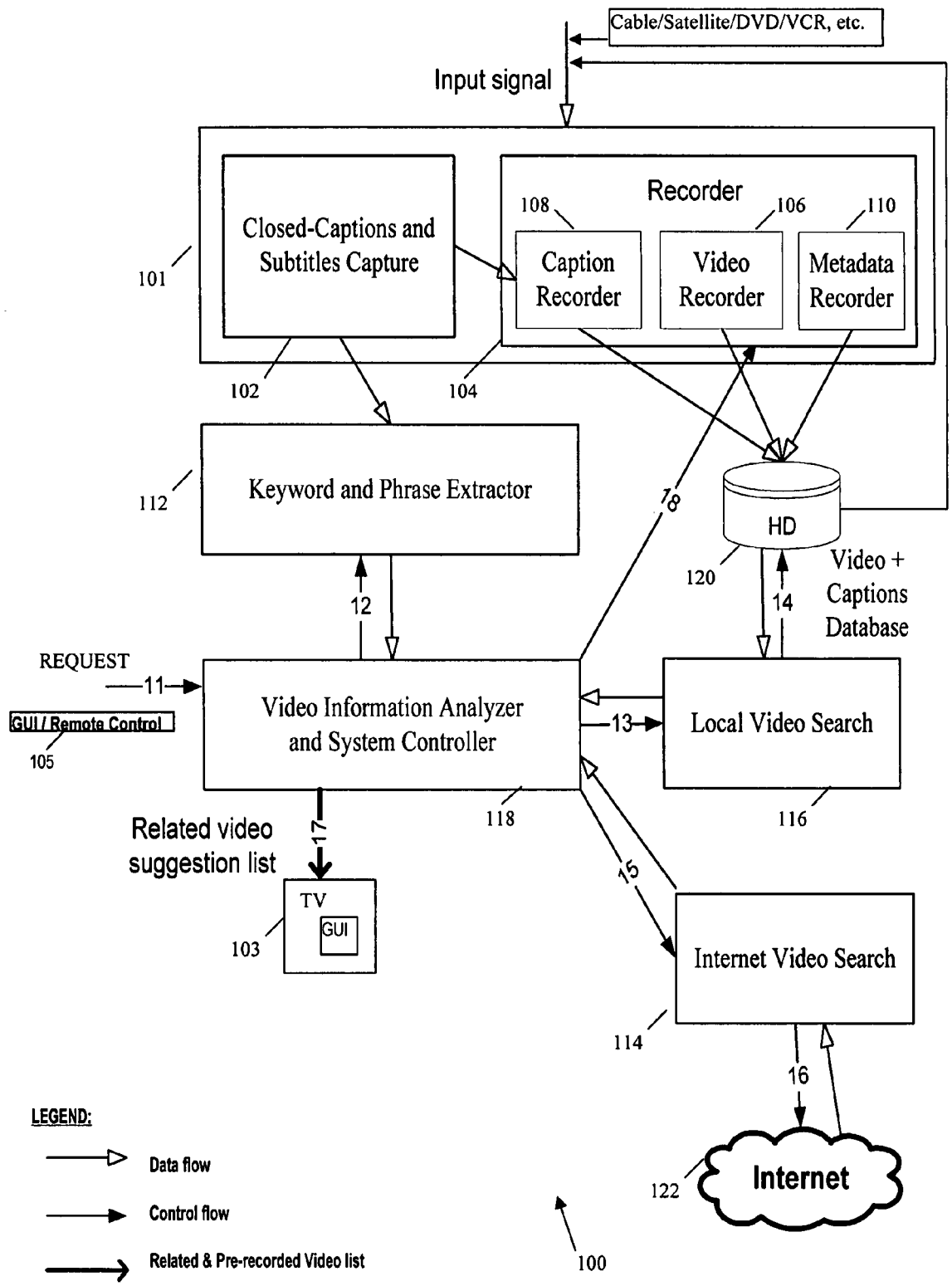
FIG. 1 shows a functional block diagram of a management system implementing a process for video recording with related video suggestion list on a PVR, according to an embodiment of the present invention.

FIG. 1 shows a functional block diagram of an embodiment of a management system 100 implementing a method for video recording with related video suggestion list for a PVR 101. The management system 100 includes multiple modules (e.g., hardware/software and/or logical modules) as described below.

A Video Information Analyzer and System Controller 118 interfaces with video record requests (commands) from the user, and controls various modules (described below) to fulfill the user request.

A Closed-Captions and Subtitles Capture module 102 captures information (e.g., closed-captions/subtitles) of a video stream in an Input Signal for the currently viewed program (e.g., video stream, TV channel on a selected channel, etc). The input signal can be from a Storage module 120, cable, satellite, or other sources of video information. The Closed-Captions and Subtitles Capture module 102 implements a text capturing process supporting existing captioning standards, that captures closed-captions or subtitles from both analog and digital signals. Real-time closed-caption text is saved continuously in a ring buffer within the module 102, which can be immediately analyzed automatically or upon request. Preferably, the ring buffer is refreshed per context change, such as channel change, program change, etc.

A Recorder module 104 comprises a Video Recorder 106, a Caption Recorder 108 and a Metadata Recorder 110. The below) for recording. Recording such information enables local video searching for compiling a related video suggestion list for the user.

The Metadata Recorder 110 records related information including metadata for the currently viewed video stream. In one example, such related information for a TV program on a selected channel includes the video stream/channel name, its type, its length, its series, etc. The Metadata Recorder 110 can obtain such information from an Electronic Program Guide (EPG) source, such as from third party "metadata aggregators" (e.g., Tribune TV Data or Gemstar TV Guide, etc.).

The Recorder 104 associates essentially all of the closed-caption and metadata, with the recorded video stream. An association scheme for the video stream, and its closed-caption and metadata, can be as simple as providing a unique directory in which the video stream and the content information (i.e., the closed-captions, metadata, the EPG information, etc.) are stored as separate identifiable files. The Recorder 104 also provides an index for: (1) keywords in the content information associated with the video recorded on the Storage 120 (or other storage such as a network server, another device, etc.), and (2) location of the video stream on the Storage 120, or other database, Internet, etc. As such, the recorded video streams, the associated keywords for each video stream, and location of each video stream, are all correlated using the index. In this manner, the Video Recorder 106 provides an integrated recording of the video stream, the closed-caption, metadata, and other information. Table 1 below provides an example of some typical (audio/video) information that is indexed (other examples are possible).

TABLE 1

| Keyword | Time point | Occurrence | Content & Metadata Location | Program Category |
| --- | --- | --- | --- | --- |
| Adaptation | 00:01:28<br>00:03:21<br>00:04:03 | 3 | /vol3/pvrstore/20060103/1900/ | Environment, Travel, Nature, Series |
|  | 00:02:06 | 1 | /vol3/pvrstore/20051202/2000/ | Sitcom, Series |
| Biology | 00:12:43 | 1 | /vol3/pvrstore/20060221/1500/ | Environment, Science |
|  | 00:15:03 | 1 | /vol3/pvrstore/20060103/1900/ | Environment, Travel, Nature, Series |
| Thunder Storm | 00:31:05<br>00:31:14<br>00:31:51 | 3 | /vol3/pvrstore/20060103/1900/ | Environment, Travel, Nature, Series |

The entries in Table 1 are as follows:
Keyword: One or more words or phrases, captured from the closed-captions or subtitles of a video stream.
Occurrence: The total number of occurrences of the keyword in the entire recorded video stream.
Time point: The points in time when each occurrence takes place (referenced from the start of the recorded video, at 00 h:00 m:00 s).
Content & Metadata Location: Locations where content and metadata of the recorded video stream can be found (this location is unique per recorded video stream).
Program Category: Category of each recorded program/video (e.g., based on metadata sources such as the EPG).

Video Recorder 106 records a requested video stream onto the Storage module 120 (e.g., disk drive, memory, etc,). In one example, the Video Recorder 106 includes a MPEG encoder chip for video encoding to a format that the PVR 101 can playback.

The Caption Recorder 108 selectively records the text captured from the closed-captions or subtitles in the incoming video stream of the input signal. The Caption Recorder 108 receives retrieved information from the Closed-Captions and Subtitles Capture component 102 for recording. The Caption Recorder 108 also receives information extracted by a Keyword and Phrase Extractor module 112 (described further The Keyword and Phrase Extractor module 112 responds to user requests received via the Controller module 118, and accesses text buffered in the Closed-Captions and Subtitles Capture module 102 to extract keywords and phrases related to the user request. A user request can be based on the information in the EPG or other relevant information for the current program, and the subject the current program.

For keyword extraction by the module 112, information of potential interest to the user is determined by monitoring user interactions with the TV 103 or the PVR 101. Important words and phrases from the closed-captions are identified as keywords. For example, when the user is watching a TV program, it is likely that that the user is interested in the content of the TV program. The content of the TV program is determined by analyzing text received as closed-captions (CC) for that TV program. Further, context can be gathered from the information about the channel being watched. Such information can be combined to make recommendations for potential topics of interest to the user.

For example, if the user is watching news coverage involving Baltimore, the word "Baltimore" is extracted by the module 112 as a keyword. This is achieved by transforming corresponding closed-captions (and/or subtitles) into text (using well-known transformation methods). Then, stop words in the text are removed. Stop words are words like "of", "on", "the" etc., which have no meaning by themselves. Then, the words in the remaining text, and their frequency occurrence, are recorded. The record of words are reset as soon as the channel is changed or a topic change is discovered using special characters in the text obtained from the closed-captions. The text can sometimes contain case information. For example, proper nouns start with uppercase letters. On other occasions, the text is case insensitive. When case information is absent, proper nouns are obtained by comparing each word against words in a dictionary that includes words that are not proper nouns. If a word under consideration is not present in the dictionary then it is assumed to be a proper noun. Proper nouns convey useful contextual information as they refer to specific names of people, places or things. Words identified as proper nouns are therefore tagged.

When case information is present, proper nouns are detected based on the case of the first character of each word. Proper nouns are tagged so that they can be detected later. At any given instant, words identified within an n second window (i.e., words received within an n second period of time, which may be the last n seconds) and their frequencies and proper noun related information are maintained. For example, an n=10 second window means that the words gathered in the past 10 seconds. The frequency of all words is used to extract words (i.e., keywords) of interest from all words gathered from the past n seconds, for the user. For example, when the user activates a specific button on (e.g., on a GUI and/or a TV remote control 105) providing a user request (e.g., action by a user such as clicking on a button), the words in the last n seconds are set-aside as the words of most importance. The frequency of each of the words set-aside is checked and each word is ranked based on its frequency. A rank is assigned to each word proportional to its frequency. Each word is also checked to determine if it is a proper noun, using the tag generated above. A ranked list is produced where high frequency words and proper nouns occupy the top of the list. The top i words from the ranked list along with proper nouns and high-frequency words identified since the start of the TV program capture the context of what the user is watching, as keywords. Words captured in the n second window, capture the context at a fine level of detail; whereas the proper nouns and high frequency words captured since the start of the program, capture the context at a higher level. Other examples of identifying important keywords and phrases from the CC are possible and contemplated by the present invention. For example, Natural Language Processing techniques can be used for part-of-speech analysis. Other examples of keyword extraction can be implemented. The module 112 performs metadata extraction (e.g., using similar steps) to extract keywords and phrases from metadata associated with the currently watched program.

The Internet Video Search module 114 processes Internet search queries for information (e.g., video, etc.) related to the program currently viewed. The queries include keywords and phrases extracted from the currently viewed program. The Internet Video Search module 114 accesses search engines on the Internet 122 to perform the search and acquire results. Each search engine may have a different set of APIs for web search capabilities. Preferably, the Internet Video Search module 114 supports access to essentially all major search engines, and provide plug-in mechanisms for extending to new search engines.

The Local Video Search 116 module correlates the content of the currently watched program with that of locally pre-recorded video. The Local Video Search 116 compares the keywords and phrases extracted from the currently viewed program (e.g., TV channel, DVD playback, etc.) by the module 112, with said index provided by the Video Recorder 104, to search for related videos on the Storage 120. Based on the association between a video stream and its metadata (including closed-captions), the Local Video Search component 116 relates the keywords and phrases from the currently viewed program video stream to the locally pre-recorded video streams (programs).

The Video Information Analyzer and System Controller 118 further analyzes available video information collected from the Internet Video Search module 114 and the Local Video Search module 116, to compile a list of information (e.g., about video streams) related to the currently viewed program to suggest to the user.

In another example, while the user is watching a current program (incoming or pre-recorded), the user issues a "search" request to the Controller 118. The Controller 118 determines the content (keyword phrase) of the current program, and uses the content to search locally for related information/video recorded on the Storage 120, and/or search for related information/video available on the Internet. The Controller 118 then compiles the search results and presents the results to the user as suggestions for review and further requests.

Figure 2:
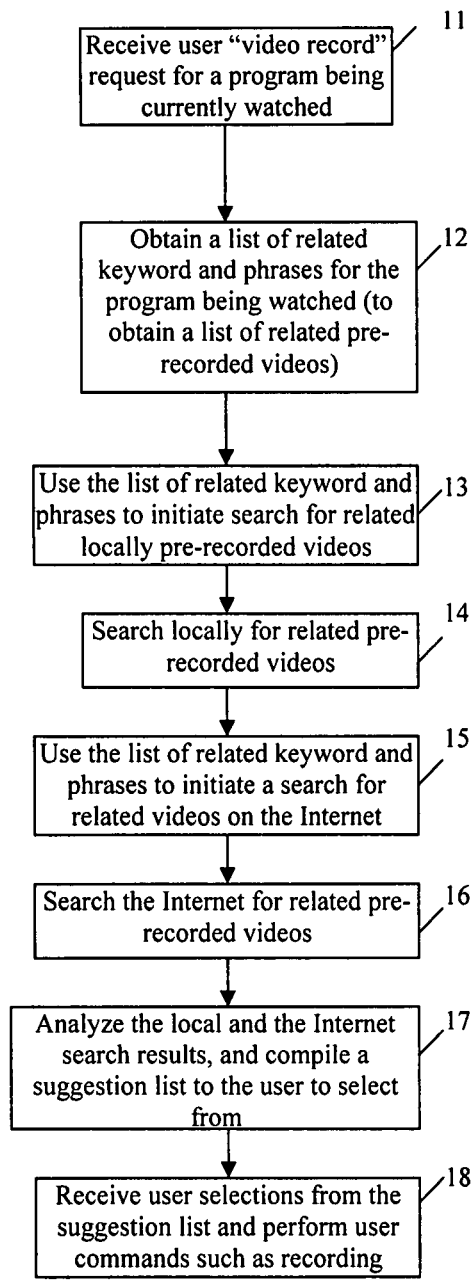
FIG. 2 shows a flowchart of an example management process implemented in the system of FIG. 1, according to an embodiment of the present invention.

The Video Information Analyzer and System Controller 118 interfaces with video record requests (commands) from the user, and controls various modules to fulfill the user request (e.g., obtaining current keywords and phrases from the program being watch, obtaining related information locally in the Storage 120, obtaining related information from the Internet, accessing the Video Recorder 104 to perform a recording task, etc.). FIG. 2 shows a flowchart (control flow) 10 of the steps of an embodiment of a management process implemented in the system 100 of FIG. 1, according to an embodiment of the present invention. For better understanding, the process steps have also been shown in FIG. 1, as the legend in FIG. 1 indicates. Referring to FIGS. 1 and 2 then, the management process includes the following steps:

Step 11. The Video Information Analyzer and System Controller 118 receives a "video record" request, to cause recording of the video program being watched. This can be via remote control, GUI on the TV screen. Such a request can also be indirectly invoked from a recording scheduler component within the PVR itself (e.g., recording schedule is set by the user). In such a case, the recording scheduler determines the video suggestion list. For example, if there is (or about to be) an exact match of the currently viewed program on another PVR in the home local network, or on the Internet, then the recording scheduler does not perform the recording.

Step 12. The Video Information Analyzer and System Controller 118 process the request, sending a command to the Keyword and Phrase Extractor 112 to obtain a list of related keyword and phrases for the program being watched. The Keyword and Phrase Extractor 112 fetches said ring buffer of current text captured by the Closed-Captions and Subtitles Capture module 102 for the program being watched. The Keyword and Phrase Extractor 112 generates a list of related keyword and phrases from said current text captured by the module 102, and provides that list to the Video Information Analyzer and System Controller 118.

Step 13. The Video Information Analyzer and System Controller 118 further sends a command to the Local Video Search module 116, passing the list of keywords and phrases acquired from the Keyword and Phrase Extractor component 112, to obtain from the Local Video Search module 116 a list of related information (e.g., videos related to the current program being watched, that have been previously recorded on the Storage 120).

Step 14. The Local Video Search module 116 performs a search on the Storage 120 to identify such related information. The Recorder module 104 records a video stream along with all its metadata, including its closed-caption and the resulting keyword and phrase list, on the local Storage 120.

Step 15. The Video Information Analyzer and System Controller module 118 further sends a command to the Internet Video Search module 114, passing a list of keywords and phrases acquired from the Keyword and Phrase Extractor module 112, to obtain a list of such related information (e.g., videos) available on the Internet (or another data base).

Step 16. The Internet Video Search module 114 uses search engine APIs to search for related videos in the Internet, as described. Since Internet video searching depends on the search engines and related web sites, this search may take more time, compared to the local video search of the Storage 120.

Step 17. The Video Information Analyzer and System Controller module 118 then receives (obtains) related information found by the search modules 114 and 116. The Controller 118 then analyzes the obtained related information and compiles a suggestion list (e.g., for related videos) to provide to the user (e.g., via a client component, or via a graphical user interface application, etc.).

Step 18. Once the suggested list of related information is presented to the user, if the user selects "record", the Controller 118 relays the record request to the Video Recorder 104 for recording the program being watched (e.g., if the program has not been locally recorded already, such as from a cable signal). In one example, if the user selects one of the suggested videos, then using the index provided by the Video Recorder 104, the Controller 118 passes the corresponding video location (i.e., location on the Storage 120, or the URL in case it is on the Internet) to a video render for playback of the selected suggested video. The Controller 118 further provides the user with an option to record the suggested video on the Storage 120, instead of watching.

The user can further tag the recorded videos, to simplify future searches of the videos. In that case, the Controller 118 allows a user to tag a video using user provided tagging information (e.g., text, numbers, etc.) associated with a video stream, which tagging information is also stored in the Storage module 120 (FIG. 1) for future look-up search of videos.

An existing PVR can be modified to include the management system according to the present invention, for storing the index for keywords related to video recorded on the PVR, and storing the location of the recorded video in the PVR. In various embodiments of the present invention, one or more of the modules 112, 114, 116, 118 and 120 can be a component of the PVR 101, or a component of another device (e.g., 107 in FIG. 5) connected to the PVR 101 via the network (e.g., 109 in FIG. 5). Each of the modules 112, 114, 116, 118 and 120 can also be an independent module in the network.

Figure 3:
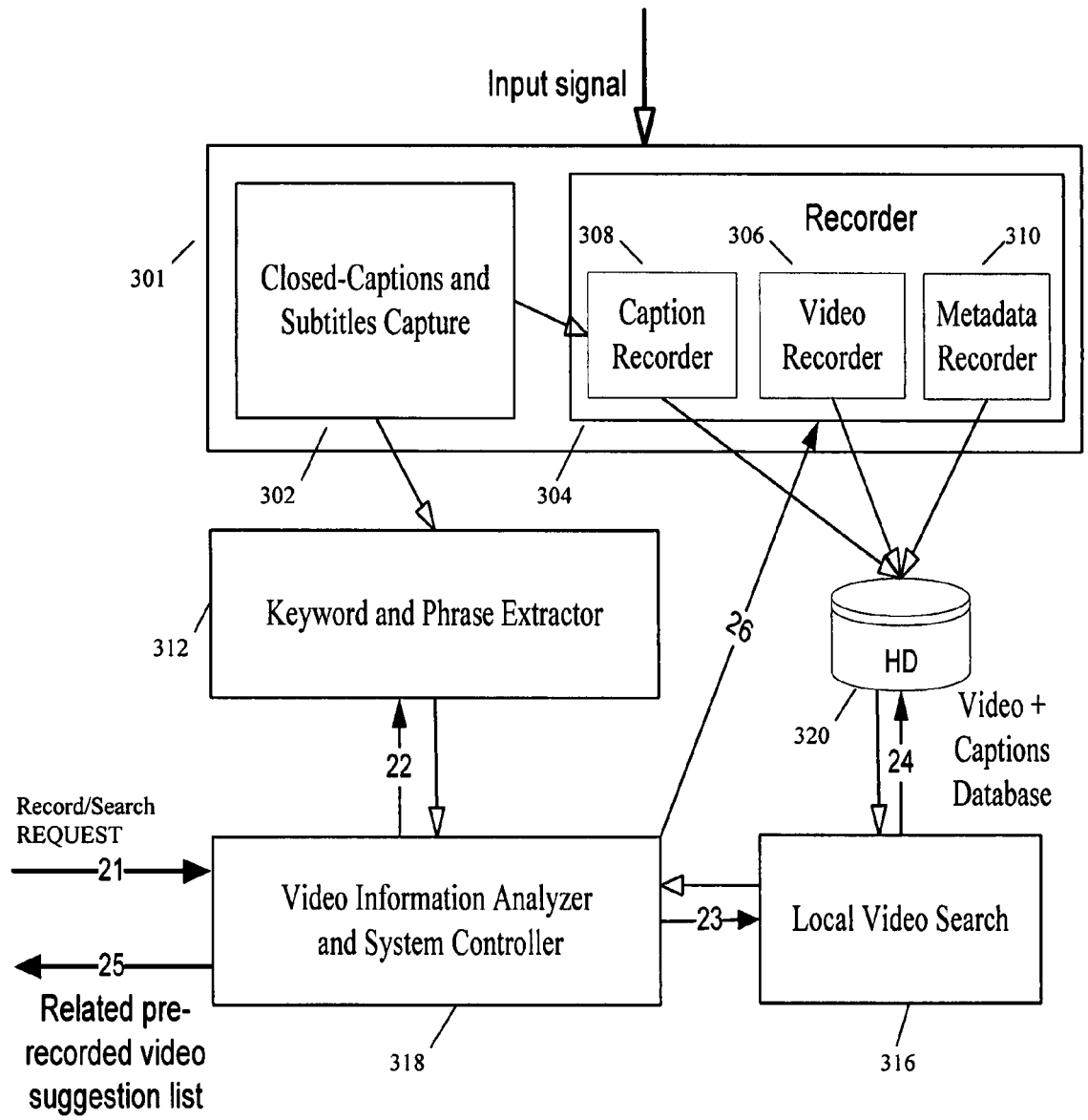
FIG. 3 shows a functional block diagram of another management system, which is a variation of the system of FIG. 1, according to another embodiment of the present invention.

FIG. 3 shows a functional block diagram of a management system 300 which is a variation of the system 100 of FIG. 1. In the system 300, the Internet connection is not possible or not preferable, whereby the system 300 does not include an Internet Video Search component. The management system 300 includes modules 301, 302, 304, 306, 308, 310, 312, 316, 318 and 320 which are similar in function to the modules 101, 102, 104, 106, 108, 110, 112, 116, 118 and 120, respectively, of the management system 100 of FIG. 1, and therefore not described further. One or more of the modules 312, 316, 318 and 320 can be a component of the PVR 301, or a component of another device (e.g., 107 in FIG. 5) connected to the PVR 301 directly or via a network (e.g., via a network 109, FIG. 5). Each of the modules 312, 316, 318 and 320 can also be an independent module in the network, and connected thereto for communication with other devices in the network. In either case, the PVR 301 and one or more of the modules 312, 316, 318 and 320 can be connected to the network.

Figure 4:
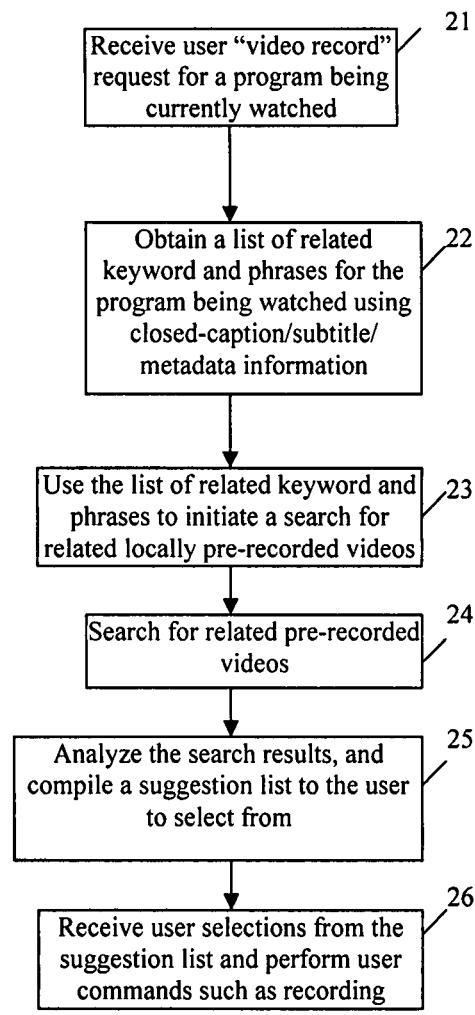
FIG. 4 shows a flowchart of another example management process implemented in the system of FIG. 3, according to an embodiment of the present invention.

FIG. 4 shows a flowchart (control flow) 20 of a management process implemented in the system 300 of FIG. 3. For better understanding, the process steps have also been shown on FIG. 3, as the legend in FIG. 3 indicates. Referring to FIGS. 3 and 4, the management method includes:

Step 21. The Video Information Analyzer and System Controller module component 318 receives a video record request for the program being watched.

Step 22. The Video Information Analyzer and System Controller modules 318 processes the request by first sending a command to the Keyword and Phrase Extractor module 312 to obtain a list of related keyword and phrases for the program being watched. The Keyword and Phrase Extractor module 312 fetches the ring buffer of current text captured from the Closed-Captions and Subtitles Capture module 302. A list of related keywords and phrases is returned to the Video Information Analyzer and System Controller module 318 from the module 312.

Step 23. The Video Information Analyzer and System Controller 318 also sends a command to the Local Video Search module 316, passing a list of keywords and phrases acquired from the Keyword and Phrase Extractor component 312, to obtain a list of related information (e.g., videos) that have been previously recorded on the local hard disk 320.

Step 24. The Local Video Search module 316 performs a search in the local Storage (e.g., database) 320 to identify related information (e.g., videos).

Step 25. The Video Information Analyzer and System Controller 318 analyzes the obtained related information and compiles related information (e.g., pre-recorded videos) to suggest to the user.

Step 26. Upon display of the suggested information, if the user selects record, the Controller 318 relays the record request to the Recorder 304 for recording the program (e.g., a TV channel) being watched. If the user selects one of the suggested videos, the Controller 318 passes the location information for the selected video to a video renderer for playback.

Figure 5:
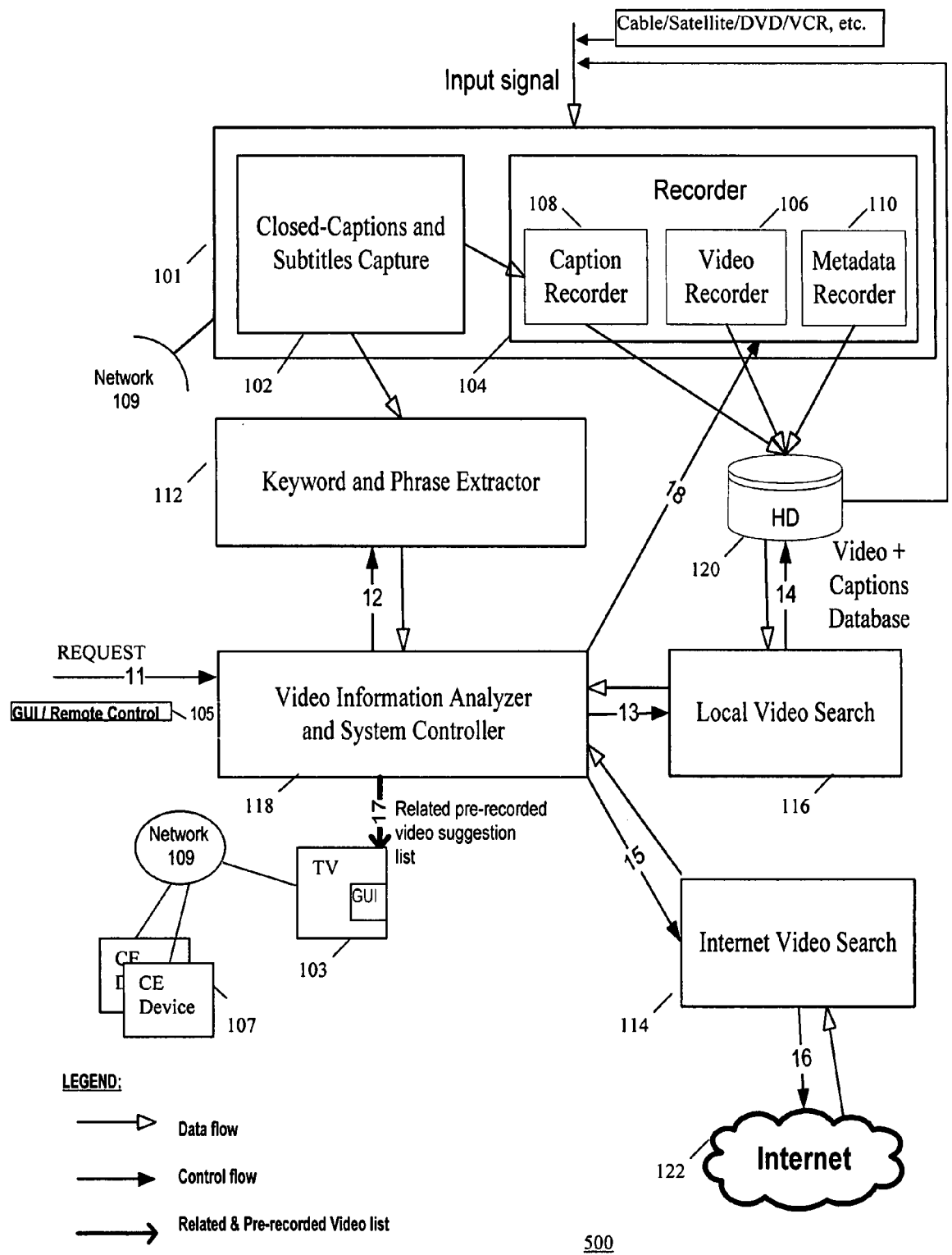
FIG. 5 shows a functional block diagram of a home network implementing a method for video recording with a related video suggestion list on a PVR, according to an embodiment of the present invention.

Referring to the example function block diagram in FIG. 5, the present invention is further useful with managing and recording audio/video streams in a network environment such as a network 500 with interconnected consumer electronics devices 107 (e.g., TV, PVR, database, DVD player, VCD, PC, set-top box, etc., connected via e.g. a IEEE1394 network 109). The home network 500 is connected to the Internet or other external source of audio/video information for searching, and the home network connected to external input audio/video signals such as cable, satellite, etc. One or more of the modules 112, 114, 116, 118 and 120 can be a component of the PVR 101, or a component of another device (e.g., 107 in FIG. 5) connected to the PVR 101 via the network (e.g., 109 in FIG. 5). Each of the modules 112, 114, 116, 118 and 120 can also be an independent module in the network that communicates with the PVR 101 by direct connection or through the network 109.

As such, in one example, the present invention makes use of the closed-captions and subtitles to obtain related locally recorded and/or downloadable/viewable videos on the Internet. The closed-captions and subtitle are used to realize related video pre-recorded by the PVR locally. The EPG is used to realize related video streams in Input Signals such as cable, satellite, etc. The present invention reduces cumbersome key inputs when user intention is about searching for related video streams locally and/or on the Internet. The related video suggestion list helps users avoid duplicated or unnecessary video recording.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of managing video information on a video recording device, comprising:
    receiving a video input signal including a video stream;
    obtaining content information corresponding to the video stream;
    storing the video stream and the content information in a database as a searchable index for the video stream;
    analyzing the content information, wherein the analyzing comprises:
        determining a frequency of at least one word in the content information; and
        identifying one or more proper nouns in the content information;
    extracting keywords for a currently watched video program included in the video stream from the content information, wherein the extracted keywords represent different levels of context information related to the currently watched video program, and wherein the extracted keywords include the following: keywords associated with different periods of time of the currently watched video program, at least one high frequency word based on the determined frequency of the at least one word in the content information, at least one proper noun of the one or more identified proper nouns, at least one keyword representing a first level of context information related to the currently watched video program, and at least one other keyword representing a second level of context information related to the currently watched video program, the second level of context information having a higher level of detail than the first level of context information;
    performing an automated search of the searchable index using the extracted keywords;
    identifying stored video streams related to the currently watched video program based on the extracted keywords; and
    providing a suggestion list based on the identified stored video streams.

2. The method of claim 1,
    wherein the searchable index includes a location of the stored video stream and identifies the content information.

3. The method of claim 2 wherein:
    the video input signal further includes the content information; and
    obtaining the content information further includes capturing the content information from the video input signal.

4. The method of claim 3 wherein the content information includes closed-captions and/or subtitles corresponding to the video stream.

5. The method of claim 2 wherein the content information includes metadata corresponding to the video stream.

6. The method of claim 1, wherein the content information includes closed-caption and/or subtitle information for the currently watched video program.

7. The method of claim 1, further comprising:
    performing an automated search of the Internet using the extracted keywords to identify video streams related to the currently watched video program.

8. The method of claim 7, wherein searching the Internet further comprises using the extracted keywords to generate queries for one or more Internet search engines to identify video streams related to the currently watched video program.

9. The method of claim 8 further comprising providing a suggestion list based on the identified video streams and the identified video streams on the Internet.

10. The method of claim 1, further comprising:
    searching for a plurality of stop words in the content information;
    preventing said plurality of stop words from being searchable; and
    associating the content information with the video stream; wherein the automated search is performed without searching said plurality of stop words.

11. The method of claim 1, further comprising:
    receiving a user selection of one or more video streams from the suggestion list for viewing; and
    replaying the selected video stream from the database.

12. The method of claim 1, further comprising:
    receiving a user selection of one or more video streams from the suggestion list for viewing and/or storing in the database.

13. The method of claim 12, further comprising playing and/or storing the selected video stream.

14. The method of claim 1, wherein the keywords included in the currently watched video program are embedded in the currently watched video program.

15. The method of claim 1 wherein extracting keywords further comprises extracting keywords based on user interest.

16. The method of claim 1, further comprising:
    searching for a plurality of stop words in the content information;
    preventing the plurality of stop words from being searchable;
    associating the content information with the video stream;
    determining information of potential user interest; and
    extracting keywords based on information of potential user interest;

wherein the first automated search is performed without searching the stop words.

17. The method of claim 16 further comprising:
determining information of potential user interest by monitoring user activity; and
extracting keywords from the currently watched video program based on information of potential user interest.

18. The method of claim 1, further comprising:
associating the content information with the video stream;
searching for a plurality of stop words in the content information;
preventing the plurality of stop words from being searchable;
transforming the content information into text; and
removing stop words from the text;
wherein the automated search is performed without searching the stop words.

19. The method of claim 18 further comprising:
recording the frequency occurrence with which non-stop words appear in the remaining text.

20. A method of managing video information for a user, comprising:
in a recording phase:
receiving a video input signal including a video stream;
obtaining content information included in the video stream, including closed-caption and/or subtitle information for the video stream;
storing the video stream and the content information in a database; and
generating an index that provides a location of the stored video stream in the database and identifies the content information;
in a viewing phase:
receiving a video input signal including a video stream comprising a video program;
analyzing the content information, wherein the analyzing comprises:
determining a frequency of at least one word in the content information; and
identifying one or more proper nouns in the content information;
extracting keywords for a currently watched video program included in the video stream from the content information, wherein the extracted keywords represent different levels of context information related to the currently watched video program, and wherein the extracted keywords include the following: keywords associated with different periods of time of the currently watched video program, at least one high frequency word based on the determined frequency of the at least one word in the content information, at least one proper noun of the identified one or more proper nouns, at least one keyword representing a first level of context information related to the currently watched video program, and at least one other keyword representing a second level of context information related to the currently watched video program, the second level of context information having a higher level of detail than the first level of context information;
performing an automated search of the index using the extracted keyword to identify stored video streams related to the currently watched video program; and
providing a suggestion list based on the identified stored video streams.

21. The method of claim 20, further comprising:
performing an automated search of the Internet using the extracted keywords to identify video streams related to the currently watched video program.

22. The method of claim 21, wherein searching the Internet further comprises using the extracted keywords to generate queries for one or more Internet search engines to identify video streams related to the currently watched video program.

23. The method of claim 22, further comprising providing a suggestion list based on the identified stored video streams and the identified video streams on the Internet.

24. The method of claim 20, further comprising:
in the recording phase:
searching for a plurality of stop words in the content information;
preventing said plurality of stop words from being searchable; and
associating the content information with the video stream;
wherein the automated search is performed without searching said plurality of stop words.

25. The method of claim 20, further comprising:
receiving a user selection of one or more video streams from the suggestion list for viewing; and
replaying the selected video stream from the database.

26. The method of claim 20, further comprising:
receiving a user selection of one or more video streams from the suggestion list for viewing and/or storing in the database.

27. The method of claim 26 further comprising playing and/or storing the selected video stream.

28. A video information management system, comprising:
an extractor to:
receive a video input signal including a video stream to obtain content information included in the video stream that comprises a video program currently being watched;
analyze the content information by:
determining a frequency of at least one word in the content information; and
identifying one or more proper nouns in the content information; and
extract keywords related to the currently watched video program from the content information, wherein the extracted keywords represent different levels of context information related to the currently watched video program, and wherein the extracted keywords include the following: keywords associated with different periods of time of the currently watched video program, at least one high frequency word based on the determined frequency of the at least one word in the content information, at least one proper noun of the identified one or more proper nouns, at least one keyword representing a first level of context information related to the currently watched video program, and at least one other keyword representing a second level of context information related to the currently watched video program, the second level of context information having a higher level of detail than the first level of context information;
a recorder to store the video stream and the content information in a database as a searchable index for the video stream, wherein the index includes the location of the stored video stream and identifies the content information; and a controller to:
perform an automated query of the searchable index using the extracted keywords; and
provide a suggestion list based on the identified stored video streams.

29. The system of claim 28 wherein:
the video input signal further includes the content information; and
the extractor obtains the content information by capturing the content information from the video input signal.

30. The system of claim 29 wherein the content information includes closed-captions and/or subtitles corresponding to the video stream.

31. The system of claim 28 wherein the content information includes metadata corresponding to the video stream.

32. The system of claim 28, wherein the content information includes closed-caption and/or subtitle information for the currently watched video program.

33. The system of claim 32, further comprising:
a search module to search the searchable index and identify stored video streams related to the currently watched video program.

34. The system of claim 33, wherein the search module uses the extracted keywords to perform an automated search of the Internet to identify video streams related to the currently watched video program.

35. The system of claim 34, further comprising:
an analyzer to associate the content information with the video stream;
wherein the extractor:
searches for a plurality of stop words in the content information; and
prevents the plurality of stop words from being searchable; and
wherein the automated query is performed without using the stop words.

36. The system of claim 35, wherein the search module uses the extracted keywords to perform an automated search using one or more Internet search engines to identify video streams related to the currently watched video program.

37. The system of claim 36, wherein the controller provides the suggestion list based on the identified video streams and the identified video streams on the Internet.

38. The system of claim 28, wherein the controller:
receives a user selection of one or more video streams from the suggestion list for viewing; and
replays the selected video stream from the database.

39. The system of claim 28, wherein the controller receives a user selection of one or more video streams from the suggestion list for viewing and/or storing in the database.

40. The system of claim 39, wherein the controller plays and/or stores the selected video stream.

41. A method of managing video information on a video recording device, comprising:
receiving a video input signal including a video stream;
obtaining content information embedded in the video stream;
storing the video stream and the content information in a database as a searchable index for the video stream;
analyzing the content information, wherein the analyzing comprises:
determining a frequency of at least one word in the content information; and
identifying one or more proper nouns in the content information;
automatically extracting keywords related to a currently watched video program included in the video stream from the content information, wherein the extracted keywords represent different levels of context information related to the currently watched video program, and wherein the extracted keywords include the following: keywords associated with different periods of time of the currently watched video program, at least one high frequency word based on the determined frequency of the at least one word in the content information, at least one proper noun of the identified one or more proper nouns, at least one keyword representing a first level of context information related to the currently watched video program, and at least one other keyword representing a second level of context information related to the currently watched video program, the second level of context information having a higher level of detail than the first level of context information;
initiating a first automated search of the searchable index using the extracted keywords for identifying stored video streams related to the currently watched video program;
initiating a second automated search of one or more Internet search engines using the extracted keywords to identify additional video streams related to the currently watched video program; and
providing a suggestion list based on the identified stored video streams from the first automated search and the second automated search.

42. A method of managing video information on a video recording device, comprising:
receiving a video input signal including a video stream;
obtaining content information corresponding to the video stream;
storing the video stream and the content information in a database as a searchable index for the video stream;
determining information of potential user interest;
analyzing the content information, wherein the analyzing comprises:
determining a frequency of at least one word in the content information; and
identifying one or more proper nouns in the content information;
extracting keywords related to information of potential user interest from the content information of a currently watched program included in the video stream, wherein the extracted keywords represent different levels of context information related to the video stream, and wherein the extracted keywords include the following: keywords associated with different periods of time of the currently watched video program, at least one high frequency word based on the determined frequency of the at least one word in the content information, at least one proper noun of the identified one or more proper nouns, at least one keyword representing a first level of context information related to the currently watched video program, and at least one other keyword representing a second level of context information related to the currently watched video program, the second level of context information having a higher level of detail than the first level of context information;
performing an automated search of the searchable index using the extracted keywords;
identifying stored video streams based on the extracted keywords; and
providing a suggestion list based on the identified stored video streams.

43. The method of claim 42,
wherein:
   determining information of potential user interest includes analyzing a currently watched video program; and
   performing an automated search of the searchable index includes identifying stored video streams related to the currently watched video program based on the extracted keywords.

44. A method, comprising:
receiving a video input signal comprising a video stream including broadcast content, wherein the video input signal comprises content information corresponding to the video stream;
analyzing the content information, wherein the analyzing comprises:
   determining a frequency of at least one word in the content information; and
   identifying one or more proper nouns in the content information;
obtaining one or more keywords related to a currently watched broadcast content included in the video stream by extracting one or more keywords from the content information, wherein the extracted keywords represent different levels of context information related to the currently viewed broadcast content, and wherein the extracted keywords include the following: keywords associated with different periods of time of the currently watched video program, at least one high frequency word based on the determined frequency of the at least one word in the content information, at least one proper noun of the identified one or more proper nouns, at least one proper noun, at least one keyword representing a first level of context information related to the currently watched video program, and at least one other keyword representing a second level of context information related to the currently watched video program and having a higher level of detail than the first level of context information;
based on the keywords obtained, identifying one or more pieces of video on demand (VOD) content related to the currently watched broadcast content; and
generating a video suggestion list including at least one of the one or more pieces of VOD content identified.

45. The method of claim 44, wherein:
the currently watched broadcast content comprises a television (TV) program broadcast on a TV channel; and
the one or more pieces of VOD content identified comprises at least one video stored on a database.

46. The method of claim 44, wherein the content information comprises one or more of the following: metadata information for the currently watched broadcast content, and closed-caption and/or subtitle information for the currently watched broadcast content.

47. The method of claim 44, wherein:
identifying one or more pieces of VOD content related to the currently watched broadcast content comprises performing an automated search using the extracted keywords to identify one or more pieces of VOD content related to the currently watched broadcast content.

48. The method of claim 44, further comprising:
receiving a user selection of a piece of VOD content included in the video suggestion list for viewing; and
playing the selected piece of VOD content from a database on which the selected piece of VOD content is stored.

* * * * *